US011087552B2

(12) United States Patent
Shatkina et al.

(10) Patent No.: US 11,087,552 B2
(45) Date of Patent: Aug. 10, 2021

(54) COLLABORATIVE ON-DEMAND EXPERIENCES

(71) Applicants: Rufina Shatkina, Orem, UT (US); Sam Gurevich, Orem, UT (US)

(72) Inventors: Rufina Shatkina, Orem, UT (US); Sam Gurevich, Orem, UT (US)

(*) Notice: Subject to any disclaimer, the term of this patent is extended or adjusted under 35 U.S.C. 154(b) by 85 days.

(21) Appl. No.: 16/697,091

(22) Filed: Nov. 26, 2019

(65) Prior Publication Data

US 2021/0158621 A1 May 27, 2021

(51) Int. Cl.
| | |
|---|---|
| *G06T 19/00* | (2011.01) |
| *G06F 3/01* | (2006.01) |
| *G06F 16/29* | (2019.01) |
| *G06Q 20/32* | (2012.01) |
| *G02B 27/01* | (2006.01) |

(52) U.S. Cl.
CPC .......... *G06T 19/006* (2013.01); *G02B 27/017* (2013.01); *G06F 3/011* (2013.01); *G06F 3/017* (2013.01); *G06F 16/29* (2019.01); *G06Q 20/325* (2013.01); *G06T 2219/024* (2013.01)

(58) Field of Classification Search
CPC . G06T 19/006; G06T 2219/024; G06F 16/29; G06F 3/011; G06F 3/017
See application file for complete search history.

(56) References Cited

U.S. PATENT DOCUMENTS

| | | | |
|---|---|---|---|
| 6,085,148 A | 7/2000 | Jamison et al. | |
| 6,401,032 B1 | 6/2002 | Jamison et al. | |
| 7,483,946 B2 | 1/2009 | Boyd | |
| 7,860,929 B2 | 12/2010 | Boyd | |
| 8,295,851 B2 | 10/2012 | Finnegan et al. | |
| 2002/0147619 A1 | 10/2002 | Floss et al. | |
| 2009/0323552 A1* | 12/2009 | Beers | H04L 65/605 370/254 |
| 2014/0006436 A1 | 1/2014 | Bonfiglio | |
| 2015/0127486 A1* | 5/2015 | Advani | H04L 65/4069 705/26.41 |
| 2015/0254618 A1 | 9/2015 | Shivaram | |
| 2017/0105053 A1* | 4/2017 | Todd | H04N 21/6587 |
| 2017/0155822 A1* | 6/2017 | Takahashi | H04N 5/23206 |

(Continued)

OTHER PUBLICATIONS

"Breeze Multi-Camera Firing your cameras at the same time", https://www.breezesys.com/how-to-trigger-multiple-canon-cameras-at-the-same-time/ (Year: 2018).*

*Primary Examiner* — Michelle L Sams
(74) *Attorney, Agent, or Firm* — Kunzler Bean & Adamson

(57) ABSTRACT

Approaches provide for the capture of data (e.g., image, video, audio, scent, etc.) for mixed-reality (e.g., augmented and/or virtual) experiences and facilitating users of electronic devices to participate in or subscribe to a mixed-reality experience. A provider such as an on-demand mixed-reality provider can capture data for use in on-demand mixed-reality experiences (e.g., a live event service, a shopping service, etc.). A collaborative data capture service can coordinate the capture of content, generate and present for display mixed-reality experiences from the captured content, connect users (e.g., virtual travelers or virtual participants, or requestors) to providers (e.g., on-demand providers), facilitate payment between requestors and providers, facilitate content licensing between license holders and providers, streamline copyright use, etc.

20 Claims, 11 Drawing Sheets

(56) References Cited

U.S. PATENT DOCUMENTS

2018/0211184 A1     7/2018  Mountassir
2018/0322702 A1    11/2018  Djajadiningrat
2018/0338119 A1*  11/2018  Hoffman ............. H04L 65/4015
2020/0242835 A1*   7/2020  Cherukuri ............... G06T 7/579

* cited by examiner

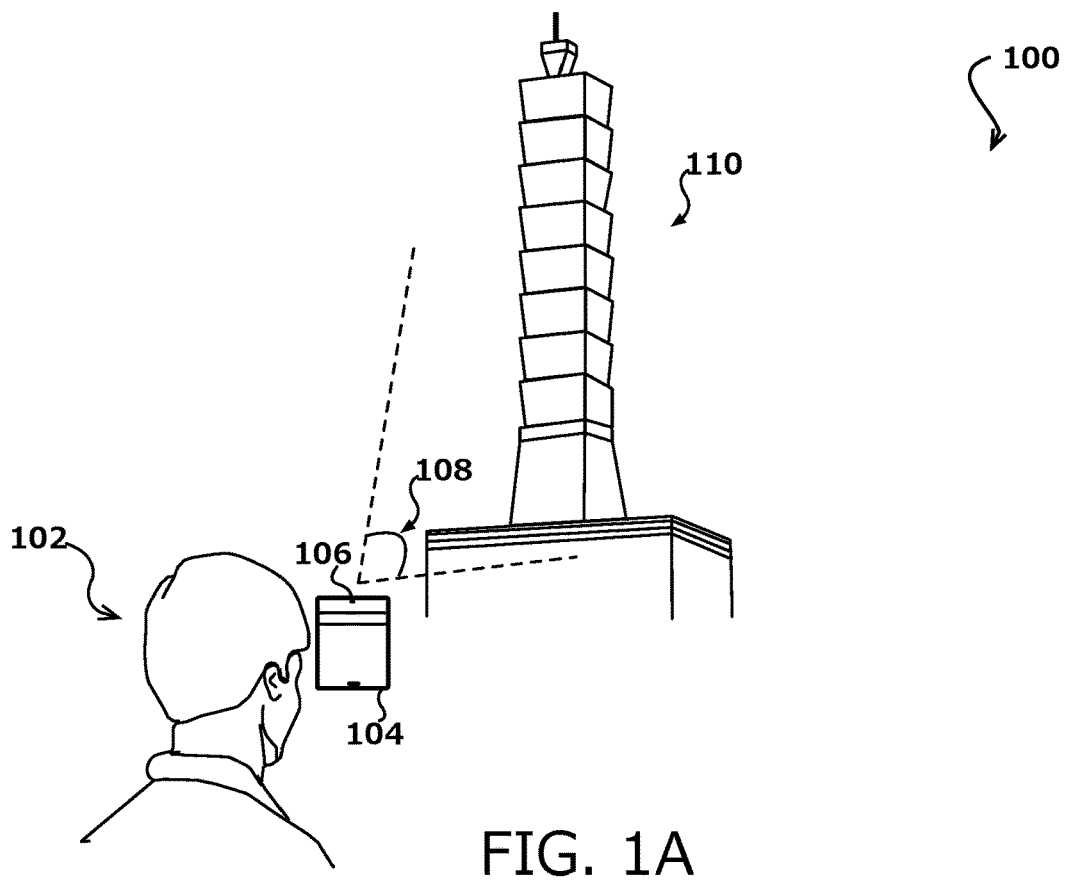
FIG. 1A
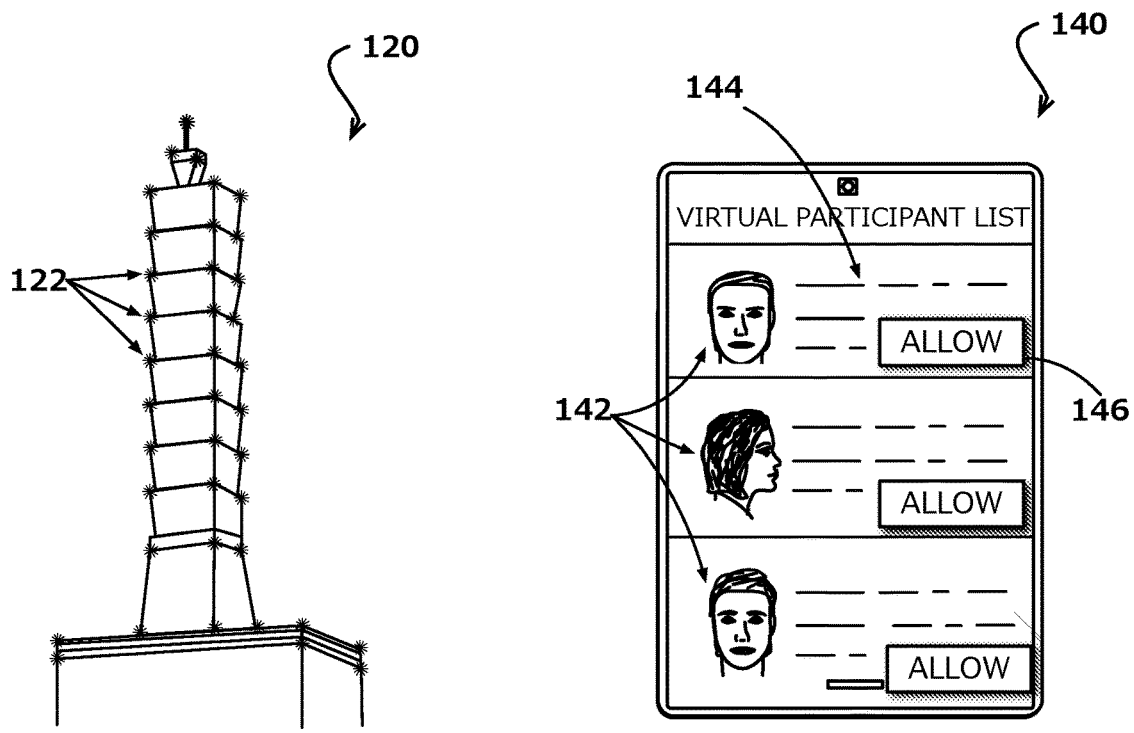
FIG. 1B
FIG. 1C

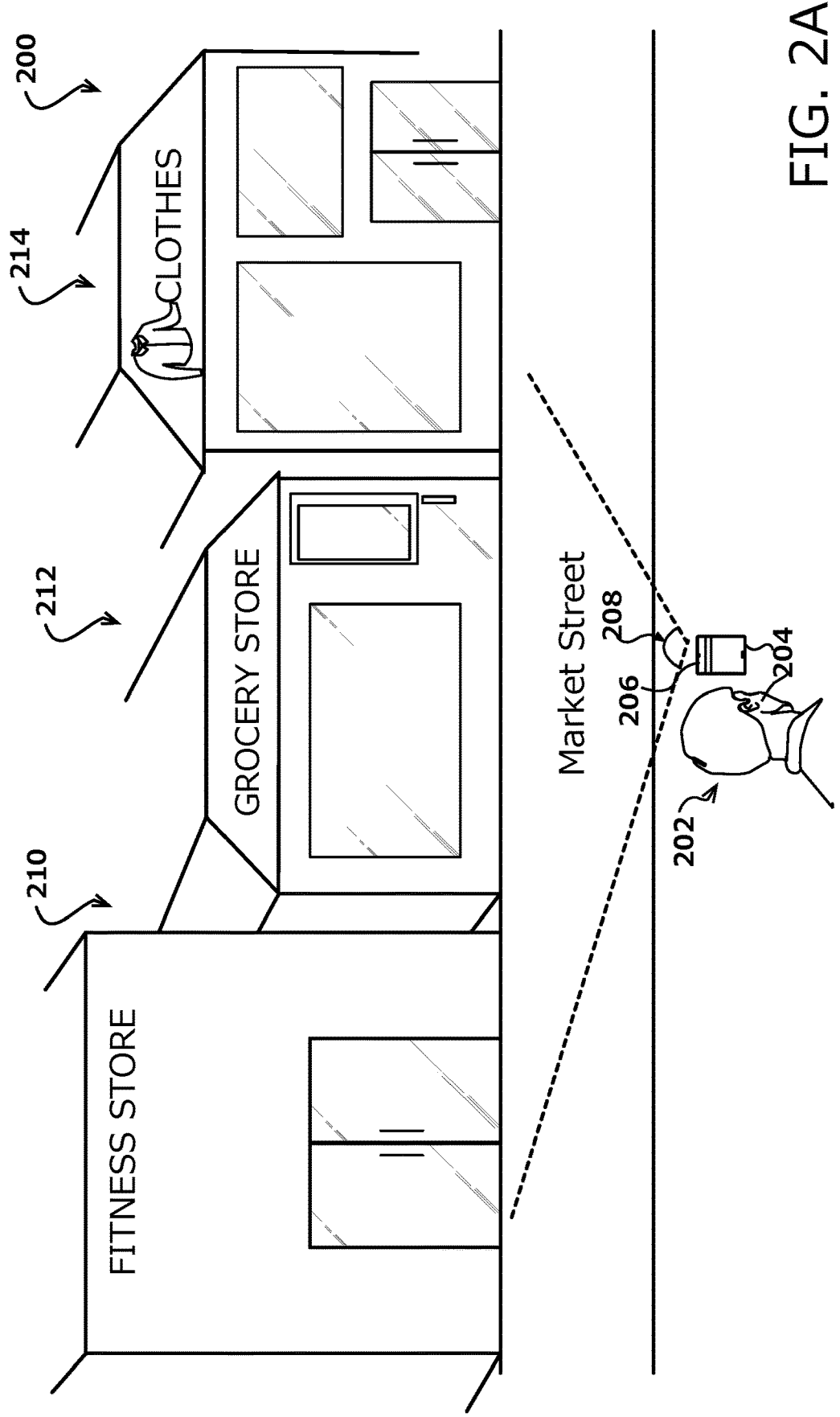

COLLABORATIVE ON-DEMAND EXPERIENCES

BACKGROUND

As personal electronic devices become increasingly sophisticated, people are using such devices in new and exciting ways. For example, users can use their portable computing devices to share personal experiences or interact with others. For example, users can share images and/or videos of different experiences such as vacations, concerts, shopping, and the like with friends, family, and other viewers. Users can also upload photos and/or videos to social networking sites or photo/video sharing services to enable others to view, comment on, and otherwise interact with the uploaded content. In conventional approaches, however, users interested in the content may be limited to viewing and some interaction with the user posting the content such as liking, commenting, and/or sending direct messages to the user. A user interested in additional information or a more in-depth experience may research the subject matter of the content, ask friends or family, post a question for answer to social media, and the like. However, such approaches can be unreliable, as many sources may have limited, forgotten, or third-hand experience. Some users may follow content providers (e.g., bloggers, influencers, etc.) for a more up-to-date experience, but the content is typically delayed, incomplete, or from single sources. Also, in many situations, users capturing content have limited tools for processing and sharing the content. What is needed is a way to experience an even deeper level of collaboration and cooperation than what is currently possible with conventional approaches.

BRIEF DESCRIPTION OF THE DRAWINGS

Various embodiments in accordance with the present disclosure will be described with reference to the drawings, in which:

FIGS. 1A, 1B, and 1C illustrate an example of users participating in an on-demand mixed-reality service in accordance with an embodiment;

FIGS. 2A, 2B, and 2C illustrate an example of users participating in an on-demand mixed-reality service in accordance with an alternate embodiment;

DETAILED DESCRIPTION

Figure 2B:
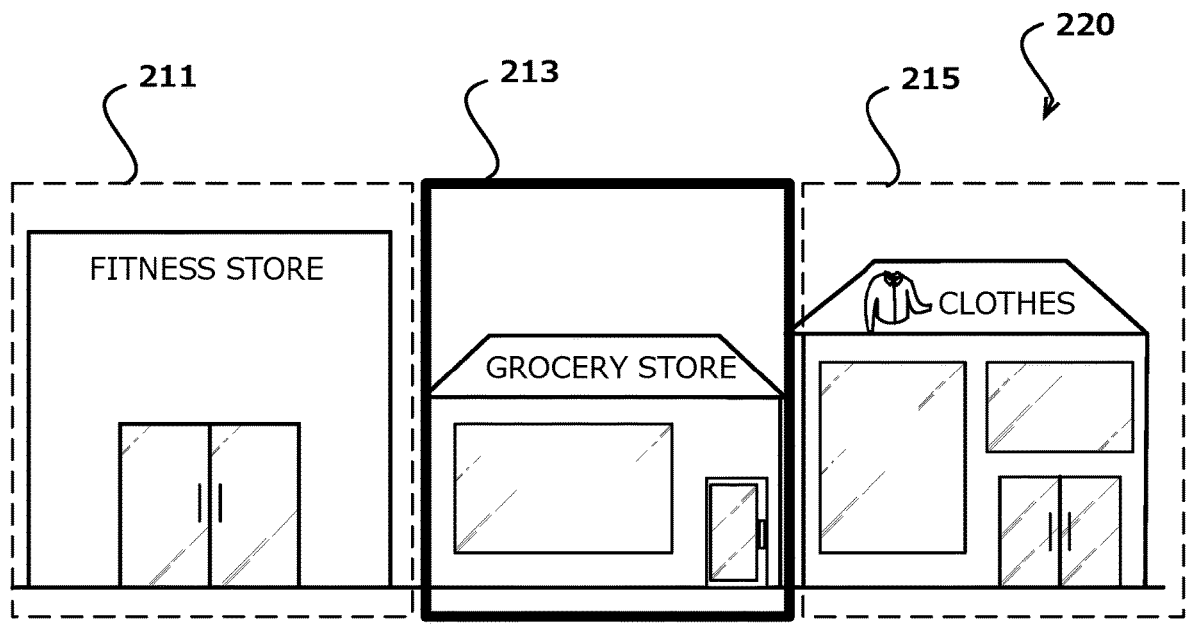

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to on-demand services. In particular, various embodiments provide for coordinating the capture of data (e.g., image, video, audio, scent, motion, etc.) for mixed-reality (e.g., augmented and/or virtual) experiences and other such experiences and facilitating users of electronic devices, and devices in communication with those electronic devices, to participate in or subscribe to an on-demand experience.

For example, a provider such as an on-demand mixed-reality provider can capture data for use in on-demand mixed-reality experiences (e.g., a live event service, a shopping service, etc.) or other such experience. The experience can be live, prerecorded, or a combination thereof. A collaborative data capturing service can coordinate the capture of data, generate and present for display mixed-reality experiences from the captured data, connect users (e.g., "virtual travelers" or "virtual participants", or "requestors") to providers (e.g., "on-demand providers"), facilitate payment between requestors and providers, facilitate content licensing between license holders and providers, streamline copyright use, etc.

In an embodiment, providers of content can elect to participate in or subscribe to a collaborative data (e.g., media content) capturing service. The providers can be users of computing devices (e.g., provider computing devices) or devices and/or components associated with provider accounts, and the electronic devices may include one or more sensors (e.g., media/content/data capturing components) that can capture data, e.g., images, video, audio, scent, motion etc., for mixed-reality (e.g., augmented and/or virtual) experiences, security, and other such uses or experiences. It should be noted that content can include any information that can be used to express or otherwise experience (e.g., view, hear, feel) an event, activity, or other occasion, and the sensors are operable to capture the information for such experiences. As used herein, the one or more sensors may also be referred to as data capturing components, content capturing components, mixed-reality capturing components, and the like. When a provider is part of the collaborative data capturing service, and a computing device of a provider is proximate to (e.g., within a threshold distance) a computing device of another provider, the data capturing components (e.g., camera, microphone, motion sensor, scent sensor, etc.) of their devices can be synchronized to obtain data—e.g., image data (e.g., image and/or video) and/or audio data, of a point of interest at substantially the same time. For example, a coordinated time at which the data capturing components capture data can be determined. The coordinated time can represent an exact time, a delay from a reference time, a difference between times, etc. The coordinated time can be used to cause the data capturing components to capture, for example, image data, at approximately the same time or in a particular sequence.

In certain embodiments, the coordinated time can be provided to each provider in response to a trigger event or a broadcasted signal. An example trigger event can include the release of a shutter or the detection of a flash pattern or audio signal. An example broadcast can consist of a message or signal to capture image data at a coordinated time.

The captured data can be processed locally on one or more provider computing devices or be uploaded to a remote server in communication with the provider computing devices. In various embodiments, the captured data can be automatically and immediately uploaded such as when the network connection of a provider's device has sufficient bandwidth or uploaded at a later time and/or uploaded at the provider's discretion.

Once the data is captured, the data can be processed using one or more media or other data processing techniques to aggregate the data, and a view of an experience based on the aggregated data can be presented. For example, image data can be stitched together to create a composite image and/or video, such as a panorama or a three-dimensional view of the point of interest and/or environment that includes the point of interest.

In accordance with various embodiments, a requestor can be matched to or can select one or more provider(s) to view media captured by those providers. For example, a requestor can have a requestor account that includes a requestor profile that includes information about the requestor such as preferences, rating, contact information. A producer can have a producer account that includes a producer profile that includes information about the producer such as preferences, rating, contact information, etc. In various embodiments, a provider can post an event of a certain activity or a trip for a specific time, date, location, and requestors interested can join the live view and experience the event. In some embodiments, one or more providers can be matched to a group of requestors, or an individual provider is matched to an individual requestor for a more personalized experience, such as a mixed-reality shopping experience. Matching a requestor to a provider can include comparing requestor user profiles to stored provider user profiles to determine a match. In the situation a match is determined, a requestor can be presented an option to view the experience provided by the provider. In response to receiving a selection to view the experience, access to the experience can be enabled. In various embodiments, an agreed-upon price may be established before access to the experience is granted.

A user interface, application, mixed-reality device (headset, smart glasses, goggles, and other virtual and/or augmented reality displays and devices), etc., can be used to view and interact with the media and or provider(s). In certain embodiments, the media can be prerecorded. In the situation the media is prerecorded, it can be recorded based on requestor specifications, or creative freedom can be afforded to the provider. As described, the captured media can be a live video stream/feed, a composite image and/or video, or a combination thereof.

Embodiments described herein provide a variety of advantages. For example, in accordance with various embodiments, an on-demand mixed-reality provider can provide on-demand mixed-reality experiences where users (virtual participants or virtual travelers, or requestors) explore any destination or location in real-time without having to be physically present at those destinations or locations by means of other users (serving as guides or providers) who are physically present at the destinations or locations and use one or more mobile devices and/or wearable devices and/or accessories to provide real-time media. An on-demand mixed reality system enables requestors to find and hire providers, virtually explore any destination or location anywhere in the world in real-time via the providers, receive personalized recommendations regarding virtual exploration sessions, make payments for virtual exploration sessions, visualize virtual exploration sessions on an interactive map or other forms of visualization, view related content such as promotions or product placements, and engage in real-time virtual shopping via providers.

Various other functions and advantages are described and suggested below as may be provided in accordance with the various embodiments.

FIGS. 1A, 1B, and 1C illustrate an example of users participating in an on-demand mixed-reality service in accordance with an embodiment. It should be understood that reference numbers are carried over between figures for similar components for purposes of simplicity of explanation, but such usage should not be construed as a limitation on the various embodiments unless otherwise stated.

FIG. 1A illustrates example 100 of users (e.g., virtual participants or requestors) participating in an on-demand mixed-reality system in accordance with an embodiment. In this example, a provider 102 (e.g., an "on-demand provider") is operating a computing device 104 (e.g., a provider computing device) at a location near a public monument 110. Although a person is shown as a provider, the provider can be any entity, including, for example, a company, a school, a government, a non-profit, etc., where one or more accounts can be associated with the entity, and authorized users of those accounts, or devices under control of an authorized user, can capture media for use in the on-demand mixed-reality system.

The computing device 104 may include at least one image capturing component 106 (such as a front- or rear-facing camera) and an interface or other display element that can display an image or video of the current/active field of view 108 being captured by the camera. The computing device 104 can also include one or more microphones or other audio capture devices capable of capturing audio data not (shown), such as words spoken by the provider 102 of the device. In some embodiments, a microphone can be placed on the same side of the computing device 104 as the display screen, such that the microphone will typically be better able to capture words spoken by a user of the device. In at least some embodiments, the microphone can be a directional microphone that captures sound information from substantially directly in front of the device and picks up only a limited amount of sound from other directions, which can help to capture better words spoken by a primary user of the device. In other embodiments, a computing device may include multiple microphones arranged to capture three-dimensional audio. In some embodiments, the imaging element of the computing device 104 can include multiple cameras, including at least one wide-angle optical element, such as a fisheye lens, on each of the front surface and the back surface of the device, that enables the device to capture images over a wide range of angles, up to 360 degrees vertically or horizontally, with respect to the device. Further, each image capture element can comprise a digital still camera, configured to capture subsequent frames in rapid succession, or a video camera able to capture streaming video. It should be understood that any device capable of receiving and processing input can be used in accordance with various embodiments discussed herein, where the devices can include, for example, head-mounted displays, notebook computers, personal data assistants, cellular phones, smart glasses or goggles, smartwatch, unmanned vehicles such as drones or other autonomous vehicles, and portable media players, among others.

As shown in FIG. 1A, provider 102 is capturing a particular perspective of a public monument 110, and provider 102 may share a live stream (or recorded or processed stream) of the monument to one or more users (e.g., "virtual participants" or "requestors" or "viewers"). Provider 102 can also share relevant information associated with public monument 110 with the requestors. In at least some embodiments, information that may be particularly relevant can include subject matter such as a description of the subject of the media, a review of the monument, etc. The provider can specify or customize the types of information initially presented for a recognized location. The provider can further customize the types of information presented for various classes of locations. For example, the provider may find a brief description or introduction of the subject matter is helpful to requestors for historical places or objects. Accordingly, the provider can select to have the introduction be displayed initially and/or prominently for historic places/objects of interest and no introduction for less well-known locations/objects of interest.

In other embodiments, the type of information displayed can be determined automatically. For example, user preferences for the requestors can be tracked, and machine learning can be used to determine the type of information to be displayed for a location or a class of locations or objects of interest. Such machine learning can be based solely on the preferences of the requestors or can be based on a community of requestors, such as requestors sharing certain demographic traits. A process that relies on data from a community of requestors may be characterized as "crowdsourced." Crowdsourcing can also be used to determine the types of information to be displayed for specific locations and/or the type of event or point of interest to display. For instance, a community of requestors may find historical or descriptive information for a particular monument, and the information can then be presented initially and/or prominently for that monument.

A level of relevance for information or experience can be determined explicitly or implicitly. For example, relevance can be determined explicitly by incorporating user interface elements asking requestors whether they found certain information helpful or not helpful, or otherwise providing some other kind of voting scheme. Information can be determined to be helpful or an event enjoyable implicitly based on user interaction with the information. For instance, certain information can be associated with a hyperlink to a webpage, and an absolute number of users or a ratio of the users accessing the hyperlink that meets a threshold value can determine whether the information is pertinent (or not pertinent). Alternatively, or in addition, information may be determined to be useful to requestors implicitly by the requestors magnifying a display area associated with the information (e.g., "unpinching" a specified area of a touch display) or the travelers focusing on the information for a certain duration of time (e.g., gaze detection). Other approaches known in the art can also be used in various embodiments.

In this example, the provider 102 can quickly obtain information about the public monument 110 by aiming the camera located on the back surface of the device 104 to capture image data of at least a portion of the monument. Example 120 shown in FIG. 1B illustrates a live view of the monument 110 provided on a display element of a device according to one embodiment. The device 104 or a server remote the device analyzes the captured image data in real-time to determine the feature points 122 of the monument 110, defines feature descriptors from the detected feature points, and sends the feature descriptors to one or more remote servers. Image analysis can be performed to correlate the captured feature descriptors with stored images from a database to determine the location corresponding to the captured image data. In other embodiments, feature extraction and feature descriptor generation occur on a still image (or video frame) rather than a live view. For instance, the provider may be required to press a shutter button of the camera before image analysis occurs. In still other embodiments, image data can be captured locally, and the captured image data can be sent (e.g., when the image data comprises one or more images) or streamed (e.g., when the image data comprises video) to the remote server(s), and the feature extraction, feature descriptor generation, and other image analysis can be performed by the remote server(s).

In various embodiments, the image analysis of captured image data can include image matching. Image matching may include sub-processes such as feature extraction and feature matching. Feature extraction techniques are the various approaches to detect and define characteristics of an image or segments of an image. The output of such techniques can sometimes be referred to as feature descriptors or signatures. Features can be global, i.e., represent the entire image, or local, i.e., describe discrete portions of an image. Image features may be extracted globally or locally according to color, texture, shape, other salient features, or some combination thereof. Once the features for an image have been extracted and defined, various feature matching methods can be used to assess the similarity between images. Similarity (or distance) measures will depend on the feature descriptors selected for extraction from an image.

Once there are hypothetical or putative matches, techniques such as geometric alignment can be used to verify which matches are inliers and which ones are outliers. In at least some embodiments, image analysis can be combined with location and/or position determination techniques to assess a provider's location (e.g., position coordinates) more quickly and precisely. For example, geolocation can be estimated according to data from GPS, an RFID system, a cellular network, a Wi-Fi positioning system, etc. Thus, in various embodiments, geolocation data can be combined with captured image data to determine the provider's location or a location identifier that represents a position including position coordinates of a computing device. For instance, the geolocation data can be used to filter or circumscribe the set of images of a comprehensive image database to be which the captured image would be compared against. Such an approach can substantially reduce the amount of processing for image analysis and yield more precise location information. In another embodiment, sensor data, such as from digital compasses, gyroscopes, or accelerometers, can be used to determine a pose (i.e., position and orientation) of a computing device. The pose data can be combined with image analysis and/or geolocation positioning to determine a precise location for the user of the device. For example, image analysis may be used to determine a location and geolocation data from a GPS and a digital compass reading of the direction the user is facing can be used to verify the recognized location with high confidence. In still other embodiments, vertical positioning can be determined from sensors such as barometers or altimeters.

Example 140 of FIG. 1C illustrates an example of a user interface displayed on a touchscreen of a computing device which provides a list of potential users (e.g., virtual participants or requestors) for the determined location or experience. As described herein, users may have an account that allows them to participate in on-demand mixed-reality experiences (e.g., a live event service, a shopping service, etc.). The content for the experiences can be generated by a collaborative data capture service can coordinate the capture of content, generate and present for display mixed-reality experiences from the captured content, connect users (e.g., virtual travelers or virtual participants, or requestors) to providers (e.g., on-demand providers), facilitate payment between requestors and providers, facilitate content licensing between license holders and providers, streamline copyright use, etc.

To access an on-demand mixed-reality experience, each requestor can use a computing device (e.g., a requestor or virtual participant computing device) to request experiences provided by a provider such as an on-demand mixed-reality provider. For example, a requestor can utilize an application (e.g., a requestor application) executing on their computing device to submit a request to an on-demand mixed-reality experience system that facilities the experiences. In various embodiments, requestors can search for experiences, post requests for experiences, etc. The on-demand mixed-reality experience system can receive the request, and can dispatch the request to one or more providers (e.g., entities that fulfill the request). Each provider has a computing device (e.g., a provider computing device) that can be used to accept the request.

In various embodiments, a provider can post an event of a certain activity or a trip for a specific time, date, location, and requestors interested can join the live view and experience the event. The provider may request a fee to join, or may utilize a bidding system to allow a set of requestors that bid an amount that satisfies the provider's requirement. For example, the provider may accept the highest bid, or may accept bids over a certain amount, or the top 3 (or some other number) of bids.

A matching system in communication with, or part of, the on-demand mixed-reality system can be configured to communicate with both requestor computing devices and provider computing devices. The requestor may use an application such as an on-demand virtual experience application executing on a requestor computing device to request to participate in a mixed-reality experience. The request may be transmitted over a communication network to the on-demand virtual experience system. The matching system may identify available providers that are registered with the on-demand virtual experience system through an application on a respective provider computing device. The matching system may send the request to a provider computing device, and the provider may accept the request through the provider computing device. The provider and the requestor may be matched and both parties may receive match information associated with the other respective party including name, mixed-reality experience, rating, past experiences, and/or any other relevant information for facilitating the match and/or service being provided.

Once a list of matched virtual participants is determined, the user interface can present an icon or image 142 representing a potential requestor. The icon or image can be a graphical or photo-realistic representation of the virtual participant. Alternatively, the icon or image can comprise a generic graphical representation of a person, a company logo, or some other image associated with the virtual participant. In one embodiment, the icon or image can be customized by the virtual participant, including an option to select from among one or more icons or images.

The interface can further include the name or screen name of each requestor and other informational elements 144, such as a description of the requestor, a fee/bid to view the point of interest, requestor rating, or any number of other information elements that a particular provider determines to be relevant to selecting requestors to interact with.

The interface can also include a number of selectable or interactive user interface elements. In this example, an "allow" button 146, when selected, can allow a requestor to interact with the provider and view content captured by the provider. In some embodiments, a selectable element can direct the provider to a profile page of the requestor that displays profile information for the requestor as well as links to communicate with the requestor. In various embodiments, a user interface selectable element may bring up an interface to edit a listing for the virtual experience. Using the interface, the provider may be able to provide a title for the virtual experience, links to information associated with the experience, etc. The listing of the experience may also include additional informational elements such as a rating for the provider, user reviews for the provider, past experiences provided by the provider, etc. The listing may also include a user selectable element to view a user profile of the provider that includes information about the provider.

In other embodiments, selectable or interactive user interface elements can also include subject matter such as recommendations for other experiences sharing common characteristics with the determined location or experience, hyperlinks to search engine results about the location or experience, etc. In some embodiments, the informational elements are customizable by the provider such that the provider can adjust the ordering of data of the various information sources, the amount of content to be displayed from each of the information sources, the type of content to be displayed from the informational sources, etc. For example, an informational element can include a selectable user interface element that enables the provider to remove the display of the informational element. When the provider selects to remove the informational element, the provider can be prompted whether they intend to remove only the one instance or all references from a source associated with the informational element.

FIG. 2A illustrates example 200 of a provider (e.g., an on-demand provider) participating in a collaborative data capturing system in accordance with an embodiment. In this example, provider 202 is operating a computing device 204 at a location near a shopping center. It should be noted that although a shopping center is shown, other locations such as markets, bazaars, fairs, shops, or any other location can be explored. The computing device includes an imaging capturing component 206 having a viewing angle 208 that is able to capture an image of at least a portion of each of the locations 210, 212, and 214. Location 210 corresponds to a fitness store, location 212 corresponds to a grocery store, and location 214 corresponds to a clothing store.

Provider 202 is participating in a live, personal shopping experience with a requestor (e.g., a virtual participant), where the requestor can virtually explore and make purchases via the provider at the shopping center.

In accordance with various embodiments, provider 202 can be a person, a company, etc. In the situation the provider is a company, the company can have an account where one or more employees can participate in the live personal shopping experience to provide requestors a more personalized and convenient experience.

In certain embodiments, media capture devices can be placed around a store in addition to, or instead of, employees using media capture devices. Other components can also be used to facilitate virtual shopping. For example, a language translation component can be used to allow communication between requestors and providers who speak different languages.

In the situation where participation in an on-demand experience in a mixed-reality environment, a map can be provided that shows stores around the world that are participating in live, personal shopping experiences. A virtual participant can quickly identify participating stores, and which stores have someone at the store to show them clothes or other items.

To help facilitate the shopping experience, a listing of available stores and information about those stores can be presented to the virtual participant. In an embodiment, to determine the available stores and information for those stores, image data captured by the computing device can be processed to identify each of the locations 210, 212, and 214, as illustrated by bounding boxes 211, 213, and 215, respectively. The image data of the locations illustrated in example 220 of FIG. 2B can be processed locally or sent to a remote server for image processing and other tasks. In an embodiment, the image data can be processed to determine the store identified in the image and information associated with the store. In certain embodiments, location information associated with the image data, GPS data for a position of the computing device, or other sensor data can be used to more accurately identify the store represented in the image data.

Figure 2C:
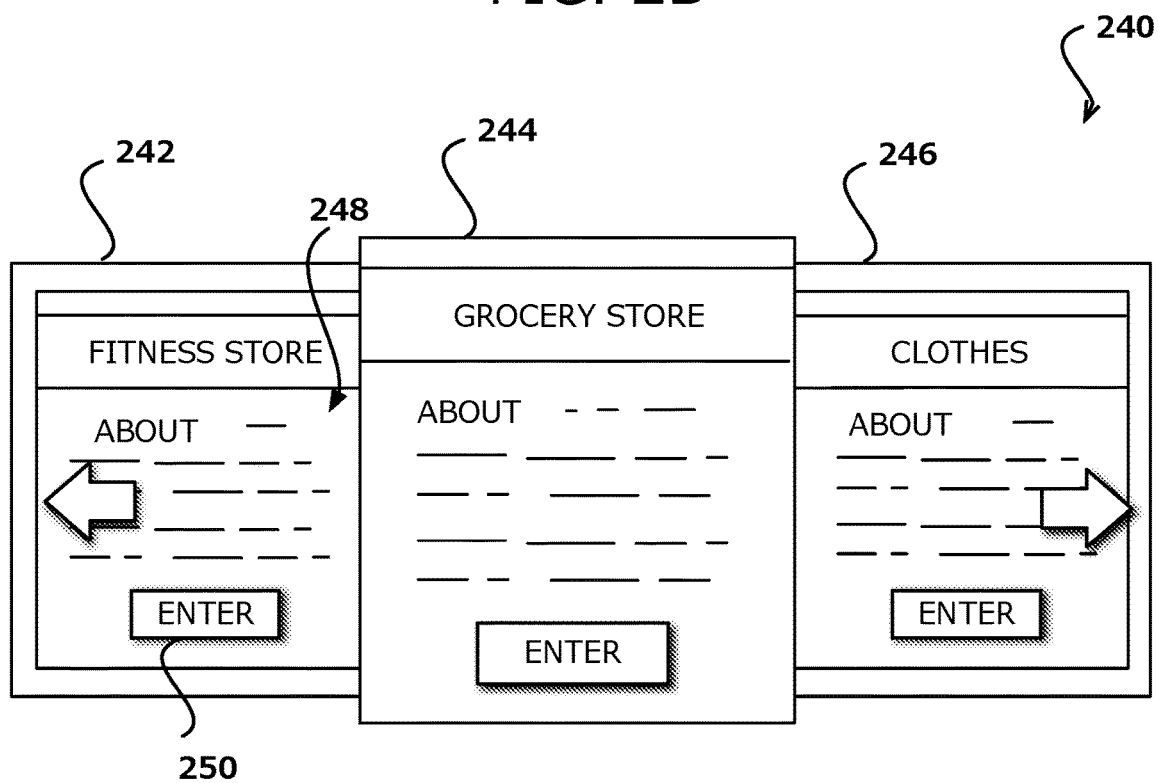

Once locations 210, 212, and 214 have been identified from the aggregation of image data and other relevant data such as geolocation information or other sensor data, the participant can be presented with views 242, 244, and 246 on a display element of a computing device of the virtual participant that corresponds respectively to recognized locations 210, 212, and 214, as illustrated in example 240 of FIG. 2C. In an embodiment, in addition to an associated image or icon, name, address, phone number 248, other such informational elements can be displayed. For example, view 242 for the Fitness Store can include informational elements such as contact information for a personal trainer or nutritionist. If the virtual participant has an account at the fitness store, view 242 can include an interface that enables the user to log into the account, and view 242 could then display informational elements for a profile of the virtual participant. In another example, view 244 for grocery store 212 can include some of the same as well as additional informational and interactive elements discussed above, such as an associated image, name of the proprietorship, user rating, price rating, address, user reviews, and other relevant informational elements. In yet another example, view 246 for clothing store 214 may include some of the same or different informational and interactive elements as described, including hours of operation, ratings, user reviews, price ranges, links to contact information, product inventory/availability of products, etc.

In various embodiments, the views can also include a number of selectable or interactive user interface elements. In this example, the views can include an "Enter" button 250 that, when selected, can direct a provider to enter a mixed-reality representation of the selected store so that the virtual participant can engage in real-time virtual shopping.

For example, once in the store, the provider can be directed to view, compare, choose, negotiate, and purchase various items. The purchase of an item can be made directly or remotely by the virtual participant and/or in-person by the provider on behalf of the virtual participant using their own money and/or money transferred to them by the virtual participant and/or the collaborative data capturing system whether it be transferred to their bank account, a debit or credit card, or by using some other method of money or virtual currency transfer. Upon purchase, the provider can ship the items to the addresses specified by the virtual traveler. In the event that the provider uses their own money to purchase items on behalf of virtual participants, the virtual participants would pay back the provider via the collaborative data capturing system.

Figure 3:
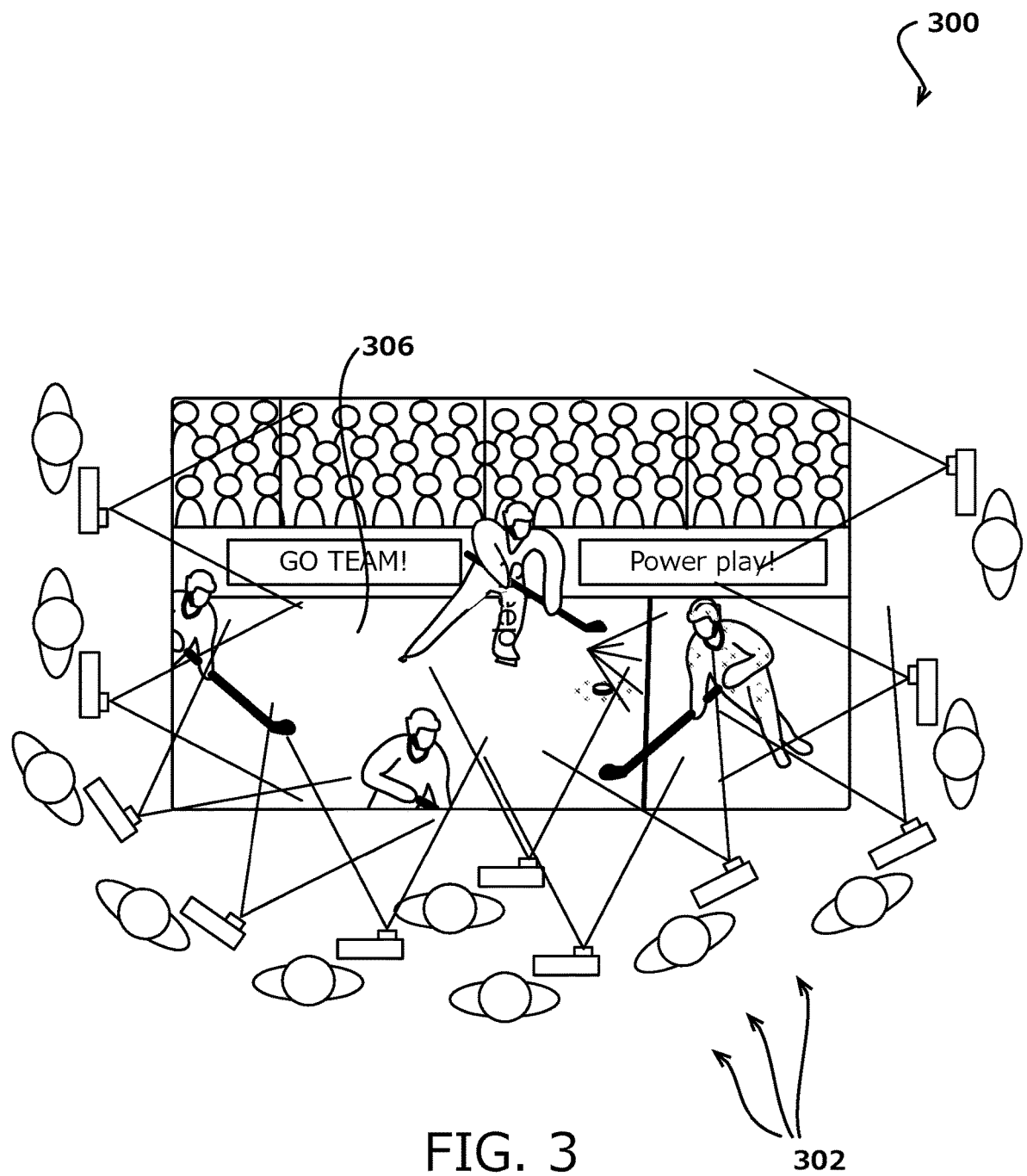
FIG. 3 illustrates of users participating in a collaborative data capturing session in accordance with an embodiment.

FIG. 3 illustrates example 300 of users (e.g., an "on-demand provider" or "provider") participating in a collaborative data capturing session in accordance with an embodiment. In this example, providers 302 are attending a hockey game, and each provider 302 is shown to be dispersed in bleachers or seating around the hockey court 306 to capture an image or video of the action on the court at multiple different angles.

In an embodiment, one or more providers 302 may have previously signed up to participate in a collaborative data capturing system. Once signed up, one or more providers can participate in the collaborative data (e.g., image, audio, aroma, etc.) capturing session, such as a collaborative image capturing session, a collaborative audio capturing session, etc. For example, each provider or at least a set of providers may be notified that they are within proximity of other providers and be invited to participate in collaborative data capturing. For example, location and/or position determination techniques can be used to assess a provider's location. In an example, geolocation can be estimated according to data from GPS, an RFID system, a cellular network, a Wi-Fi positioning system, etc. The geolocation data can then be used to notify providers within proximity of other providers. In another embodiment, sensor data, such as from digital compasses, gyroscopes, or accelerometers, can be used to determine a pose (i.e., position and orientation) of a computing device. The pose data can be combined with geolocation positioning to determine a precise location for the user of the device. For example, geolocation data from a GPS and a digital compass reading of the direction the user is facing can be used to verify the recognized location with high confidence. In still other embodiments, vertical positioning can be determined from sensors such as barometers or altimeters.

In another embodiment, a provider may create a collaborative data capturing event at a current location. The provider can designate the event public or private. When the event is designated private, the provider can invite other providers to participate in the event by sending out an invitation such as a push message, email, text message, etc. In the situation the event is designated public, any provider within a particular area of the current location can participate in a collaborative data capturing session.

In yet another embodiment, a virtual traveler may submit a proposal that invites one or more providers to participate in a collaborative data capturing session.

Once the media capturing session is initiated, communication between provider devices, between provider devices and a remote server, or a combination thereof can be over one or more communication channels, including, for example, a cellular channel, a Wi-Fi channel, a Bluetooth® channel, or another conventional communication channel.

The remote server can include one or more computer systems, a provider device that has created a collaborative data capturing event, or a combination thereof. Thereafter, the providers can capture media in accordance with embodiments described herein.

Figure 4:
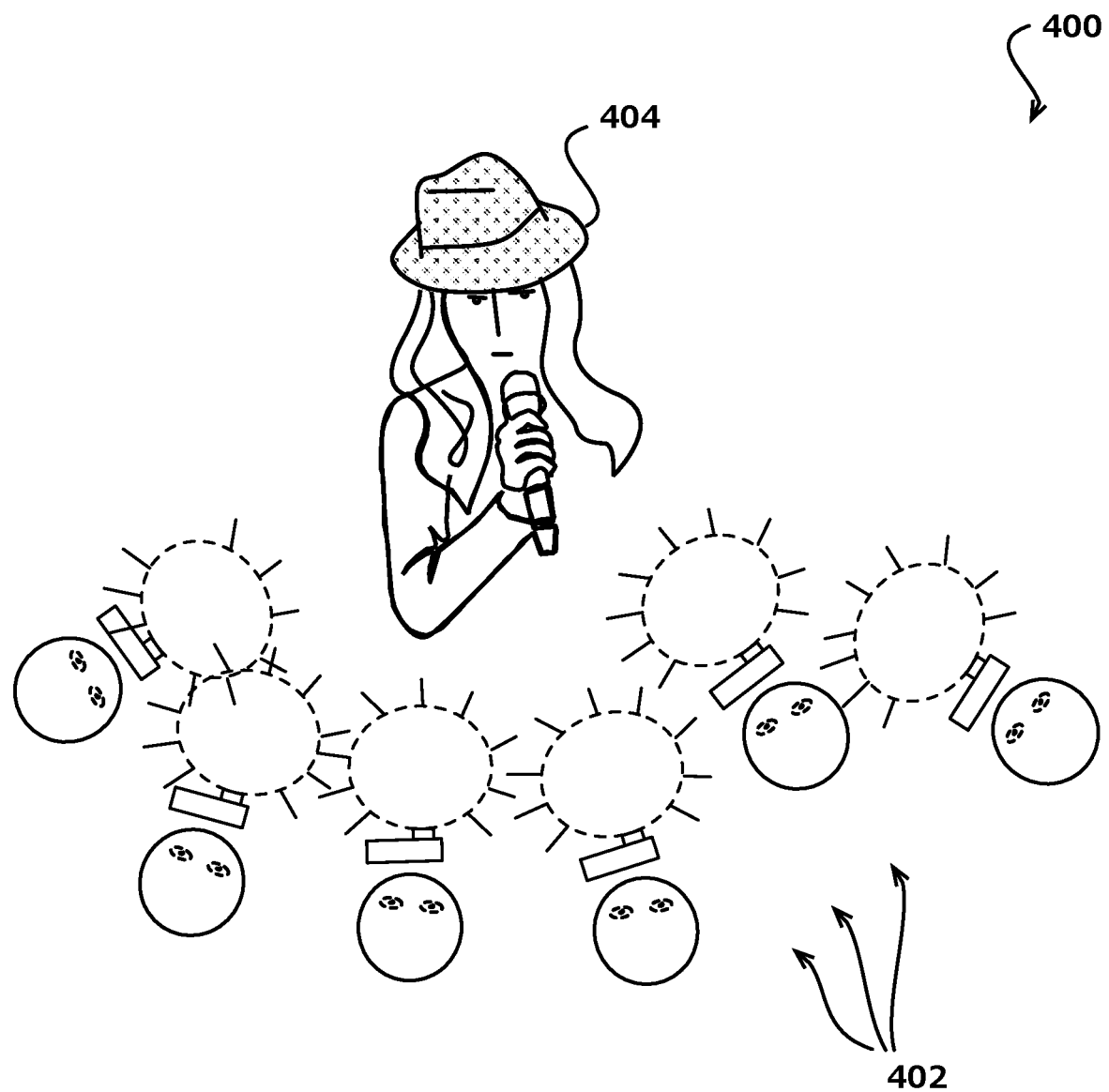
FIG. 4 illustrates of example of capturing media during a collaborative data capturing session in accordance with an embodiment.

FIG. 4 illustrates example 400 of a group of providers capturing media in a collaborative data capturing system in accordance with an embodiment. In this example, providers 402 are attending a concert with a live performer 404, and each provider is capturing a picture of the concert at their respective location. Similar to FIG. 3, each provider 402 can be dispersed around the event to capture an image or video of the event at multiple different angles.

In accordance with various embodiments, media capture can be managed or otherwise controlled. For example, in an embodiment, one or more providers 402 may have previously signed up to participate in a collaborative data capturing service, where the providers' devices can be configured to capture media data automatically. In an example, when a provider is participating in the collaborative data capturing service and the provider is proximate to another provider, the data capturing components (e.g., camera, microphone, etc.) of their devices can be synchronized to obtain image data (e.g., image and/or video) and/or audio data of a point of interest at substantially the same time. For example, a coordinated time at which the data capturing components capture image data can be determined. The coordinated time can represent an exact time, a delay from a reference time, a difference between times, etc. The coordinated time can be the same, or different, for each provider. In certain embodiments, the coordinated time can be used to cause the capturing components to capture, for example, image data at approximately the same time or in a particular sequence. In the situation the coordinated time is used to capture image data in a particular sequence by a set of providers, each provider may be provided a specific time to capture media data.

The coordinated time can be based on a number of attributes, including, for example, orientation and/or position data from motion/orientation determining components of the participating devices, such as gyroscopes, accelerometers, and/or digital compasses, device characteristics (e.g., flash brightness, camera resolution, etc.)

In an embodiment, the coordinated time can be determined by a primary device, a remote server, or a combination thereof. The primary device can be predetermined or selected randomly. For example, a device initiating the session can be the primary device. The primary device can change or be updated during the collaborative data capture session. The primary device can be selected based on characteristics of each of the devices. For example, a device having the fastest processor, most stable internet connection, best view of the point of interest, etc. may be selected. In certain embodiments, a requestor may select the primary device. For example, a requestor can be presented operating characteristics of each of the devices, such as a view of image data captured from each of the devices, battery level of each of the devices, processing speed of each of the devices, memory, etc., and can select which device to have as a primary device. The list of devices can also be ranked, for example, most optimal to the least optimal, and the primary device can be selected based on the list of devices.

In an embodiment, device characteristics can be sent to a central server. The central server can analyze the device characteristics and select a primary device.

In various embodiments, the remote server can process characteristics of each of the devices to determine a coordinated time. Once the coordinated time is determined, for each device independently or the same coordinated time for each device, the coordinate time can be sent to each of the devices, and the devices can capture media in accordance with the coordinate a time.

The coordinated time can be provided to each provider in response to a trigger event or a broadcasted signal. An example trigger event can include the release of a shutter ("shutter release"), detection of a flash pattern, or audio signal. An example broadcast can include a message or signal to capture image data at a coordinated time.

Figure 5:
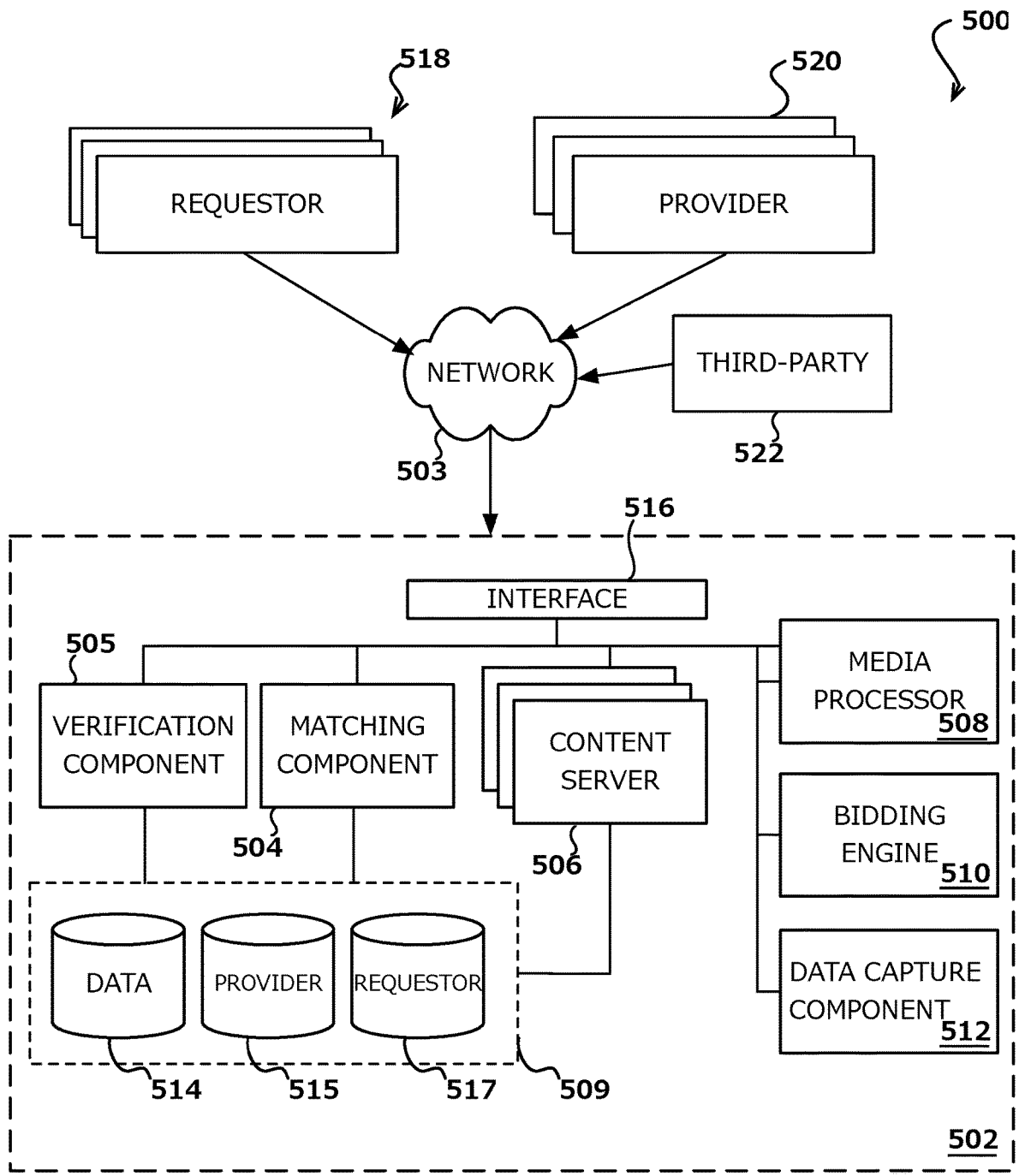
FIG. 5 illustrates an example environment in which aspects of the various embodiments can be implemented.

FIG. 5 illustrates a block diagram 500 of components of a collaborative data capture system for capturing and presenting content in accordance with various embodiments. In this example, an on-demand mixed-reality system 502 includes verification component 505, matching component 504, content server 506, media processor 508, bidding engine 510, and data capture component 512. On-demand mixed-reality system 502 may also include one or more data stores 509, including, for example, data store 514, provider data store 515, and requestor data store 517. It should be noted that although the data stores are shown as separate data stores, data from the data stores can be maintained across fewer or additional data stores. The data stores can be accessed by verification component 505, matching component 504, and content server 506 to obtain information in order to perform the functionality of the corresponding component. Although on-demand mixed-reality system 502 is shown as a single system, the on-demand mixed-reality system 502 may be hosted on multiple server computers and/or distributed across multiple systems. Additionally, the components may be performed by any number of different computers and/or systems. Thus, the components may be separated into multiple services and/or over multiple different systems to perform the functionality described herein.

In this example, users of electronic devices can participate in or subscribe to an on-demand mixed-reality experience. For example, a provider 520 (e.g., an on-demand provider) is able to use a computing device (e.g., a provider computing device) to submit a request to initiate a collaborative data capture session across at least one network 503. In various embodiments, requestor 518 (e.g., a virtual participant) is able to use a computing device (e.g., a requestor device) to submit a request to initiate a mixed-reality experience. As described herein, the mixed-reality virtual experience can include a live view of a point of interest, a live shopping experience, etc. In certain embodiments, the experience can include prerecorded data of the point of interest. The live shopping experience can be between a requestor and a provider, where the provider can be a retail outlet or an individual provider who can assist the virtual participant in shopping at a specific store by demonstrating how specific clothes look when worn, as well as provide feedback such that the virtual participant can make a purchasing decision.

The request is received by network interface layer 516 via network 503. In an embodiment, the at least one network 503 can include any appropriate network, such as may include the Internet, an Intranet, a local area network (LAN), a cellular network, a Wi-Fi network, and the like. In any situation, the request can be sent to an appropriate content provider environment that includes on-demand mixed-reality system 502.

The content provider environment can provide one or more services, systems, or applications for processing such requests. The content provider can be any source of digital or electronic content, as may include a website provider, a video or audio content distributor, a hotel provider, a travel agency, and the like.

Interface 516 may include any software and/or hardware components configured to send and receive communications and/or other information between on-demand mixed-reality system 502 and requestors (e.g., virtual participants) 518, providers (e.g., on-demand providers) 520, and third-party 522. In various embodiments, interface 516 may include a data interface and service interface and may be configured to periodically receive data sets, requests, and/or any other relevant information to facilitate real-time virtual experiences. Interface 516 can include any appropriate components known or used to receive requests from across a network, such as may include one or more application programming interfaces (APIs) or other such interfaces for receiving such requests. Interface 516 might be owned and operated by a provider, such as an on-demand mixed-reality provider or leveraged by a provider as part of a shared resource or "cloud" offering.

Once the request is received at interface 516, the request can be analyzed, and at least a portion of the information in the request can be directed to an appropriate system or service, such as content server 506 (e.g., a Web server or application server), among other such options. In the case of initiating a collaborative data capture session, for example, content server 506 can interact with other components to generate code and send data for coordinating media capture, generating and presenting mixed-reality experiences from the captured media, connecting requestors to providers for mixed-reality experiences, etc.

This may further include directing information to at least one other server for processing. The servers or other components of the environment might access one or more data stores, such as provider data store 515 that contains information about the various providers, requestor data 517 that contains information about the various requestors, and one or more data repositories 514 storing captured content able to be served to those participating in collaborative data capture sessions and mixed-reality experiences.

As mentioned, in at least some embodiments, the data used in mixed-reality experiences can be generated using media processor 508 or other such component or service that analyzes the provided data and attempts to generate mixed-reality experiences as described herein. In some embodiments, this can include utilizing content generated within the content provider environment by providers or received from one or more third-party providers 522, among other such options. The analyzed data, e.g., image data, can be stitched together to create a composite image and/or video, such as a panorama or a three-dimensional view of the point of interest and/or environment that includes the point of interest. In various embodiments, sensors can be used to capture smells, touch, and other sensory inputs, which can be incorporated in mixed-reality experiences. Thereafter, a user interface, application, mixed-reality device (headset, smart glasses, goggles, and other virtual and/or augmented reality displays and devices), etc., can be used to view and interact with the processed media and/or provider. In addition to interacting with the media and/or provider, in accordance with an embodiment, certain experiences can enable/allow a requestor to sample certain smells/aromas, weather conditions, ambiance of a specific place, food, etc.

Verification component 505 can be configured to verify an identity and/or media capturing devices (e.g., approved equipment) of the provider. In an embodiment, one or more approaches can be used to verify a provider. For example, a provider may have to submit appropriate documentation. And another example, a provider may be interviewed. In yet another example, verifying a provider can also include verifying a bank account of the provider, home address, phone number, email address, etc., of the provider.

Matching component 504 can be configured to match providers and requestors. For example, matching requestors with a provider can include using a matching algorithm that compares features determined from requestor user profiles (e.g., requestor user data) and other information to features determined from provider user profiles (e.g., provider user data) and other information to determine a match. Any number of matching techniques can be utilized to analyze the feature vectors and assess the similarity between provider/experience and virtual participant. In an embodiment, similarity (or distance) measures may depend on the feature descriptors for the provider/experience and requestor. For a more personalized experience, such as in the situation where a requestor desires a provider to try on clothing, make-up, etc., matching can take into consideration the height, size, weight, hair color, complexion, etc., of the provider, so that the requestor can better see how a particular size clothing looks on a similar body type and can receive more specific feedback from the provider on how the item fits, the comfort level of the garment, etc.

In the situation a match is determined, a requestor can be presented with the option to view the experience provided by the provider. For example, in response to receiving a selection to view the experience, access to the experience is enabled. The experience can be shared with one or more virtual travelers. The experience can be with a small group or individual experience where the requestor can direct or otherwise suggest to one or more providers where to go and what to do. For example, a requestor may coordinate with a provider for a mixed-reality shopping experience, a mixed-reality home or apartment viewing experience, or other experience described herein.

Bidding engine 510 can be configured to process bid requests from requestors and present those bid requests to an appropriate provider. For example, a provider may post an experience, or a requestor may request an experience for events such as skydiving, urban hiking, outdoor hiking, camping, scuba diving, concerts, amusement parks, fitness classes, cooking classes, education classes, child care, searching for real estate or rentals, do-it-yourself projects, product reviews, animal shelters, animal parks, shopping (e.g., grocery, clothing, consumer goods, vehicle, etc.) In certain embodiments, the event can be spontaneous, where the provider live streams daily activities where any interested party may join. As a condition of the experience, the provider may limit the number of virtual participants that can subscribe to the mixed-reality experience. At the end of a bidding session, bidding engine 510 can rank the bids by, for example, bid amount, and requestors can be assigned an opening based on respective bid amounts. For example, in the situation that the provider limits the number of requestors to three, bidding engine 510 can rank the bids by bid amount and assign in the requestors with the three highest bid amounts to the available openings. In another example, the provider may set a minimum bid amount and not place a limit on the number of virtual participants. In another example, bidding engine 510 can process incoming bids and assign requestors an opening when their bid satisfies (meets or exceeds) the minimum bid amount. In yet another example, a requestor can propose an amount to a producer for an on-demand experience. The producer can accept, decline, or negotiate a different amount.

Media capture component 512 is operable to facilitate collaborative data capture. For example, media capture component 512 can coordinate media capture, generate and present mixed-reality experiences from the captured media, connect users (e.g., virtual travelers or virtual participants or requestors) to on-demand providers (e.g., providers), facilitate payment processing, content licensing, copyright, etc. In an embodiment, multiple providers of content can elect to participate in or subscribe to a collaborative data capturing session. When a provider is part of the collaborative data capturing system, and the provider is proximate to another provider, the data capturing components (e.g., camera, microphone, etc.) of their devices can be synchronized to obtain image data (e.g., image and/or video) and/or audio data of a point of interest at substantially the same time.

For example, a coordinated time at which the data capturing components capture image data can be determined. The coordinated time can represent an exact time, a delay from a reference time, a difference between times, etc. The coordinated time can be used to cause the capturing components to capture, for example, image data at approximately the same time or in a particular sequence. The coordinated time can be provided to each provider in response to a trigger event or a broadcasted signal. An example trigger event can include the release of a shutter or detection of a flash pattern or audio signal. An example broadcast can include a message or signal to capture image data at a coordinated time.

Although on-demand mixed-reality system 502 is shown in a single system, the system 502 may be hosted on multiple server computers and/or distributed across multiple systems. Additionally, the components may be performed by any number of different computers and/or systems. Thus, the components may be separated into multiple services and/or over multiple different systems to perform the functionality described herein.

Figure 6:
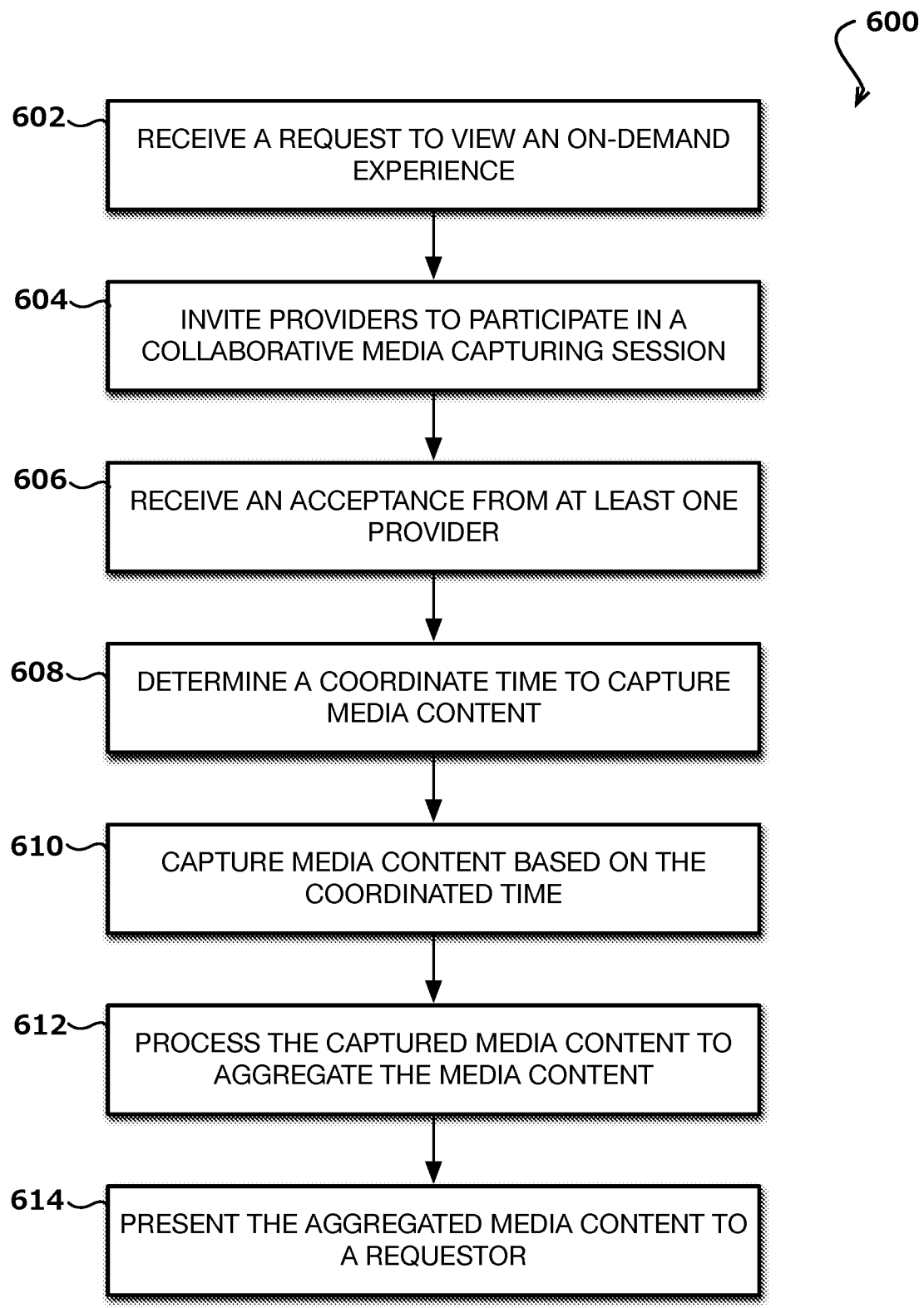
FIG. 6 illustrates an example process for coordinating the capture of data (e.g., image, video, audio, scent, etc.) for mixed-reality (e.g., augmented and/or virtual) experiences and facilitating users of electronic devices to participate in or subscribe to a mixed-reality experience in accordance with various embodiments.

FIG. 6 illustrates an example process 600 for coordinating the capture of content (e.g., image, video, audio, scent, motion, etc.) for mixed-reality (e.g., augmented and/or virtual) experiences and facilitating users of electronic devices to participate in or subscribe to a mixed-reality experience in accordance with various embodiments. It should be understood that, for any process discussed herein, there can be additional, fewer, or alternative steps, performed in similar or different orders, or in parallel, within the scope of the various embodiments unless otherwise stated. In this example, a request to view an on-demand experience is received 602. The on-demand experience can be for a particular point or item of interest. The request can be from a requestor (e.g., a virtual participant) using an application such as an on-demand virtual experience application to request to participate in a mixed-reality experience. The request may be transmitted over a communication network to the on-demand virtual experience system. One or more providers who have previously signed up to participate in a collaborative data capturing system can be invited 604 to participate in a collaborative data capturing session. For example, location and/or position determination techniques can be used to assess a provider's location. The geolocation data can then be used to identify potential providers. Stored provider information for the potential providers can be analyzed to identify at least one provider to help capture data. Matching providers can be invited to participate in the collaborative data capturing session. An acceptance to the request is received 606 from at least one provider. The acceptance can be associated with location information of the device associated with the acceptance, a timestamp representing a time the acceptance was generated, and orientation information of the device. A coordinated time (e.g., a time period or other indication of time) at which the data capturing components of the producers capture data can be determined 608 and provided to the producers. The coordinated time can represent an exact time, a delay from a reference time, a difference between times, etc. The coordinated time can be used to cause the data capturing components to capture 610, for example, image data based on the coordinated time. Once the data is captured, the media can be processed 612 using one or more media processing techniques to aggregate the data. The captured media can be processed locally on one or more provider computing devices or be uploaded to a remote server in communication with the provider computing devices. In various embodiments, the captured media can be automatically and immediately uploaded such as when the network connection of a provider's device has sufficient bandwidth or uploaded at a later time and/or uploaded at the provider's discretion. The processed data (e.g., composited media content/data) content can be presented 614 to the requestor. For example, image data can be stitched together to create a composite image and/or video ("composite media data"), such as a panorama or a three-dimensional view/representation of the point of interest and/or environment that includes the point of interest.

In accordance with various embodiments, a process to participate in an experience can begin with a request. The request can be for a live travel experience, a live shopping experience, or other such experience. The request can specify a particular time for the experience, such as a current time or a scheduled time. Once the request is created, a notification including the request can be sent to potential providers to fulfill the request. The notification can be sent to requestors based on notification preferences of the requestors such as event type, geographic location, keywords, etc. Providers can be presented with the option to bid on the request, accept the request, or reject the request. In the situation the requestor accepts a response (e.g., accepts the bid and terms of the experience) to the request, the experience can commence. In another example, a provider can schedule an event for a specific time/date/location, and a community of requestors can be notified (e.g., based on event type, geographic location, keywords, etc.) and/or search for the event or a provider can start transmitting an event live and the system can notify a community of requestors that a live view is in progress and anyone can join for a fee. In either situation, the provider performs the experience in accordance with the terms of the experience. During the experience, the requestor can be presented recommended content (e.g., advertisements), discounts to other experiences, etc. The requestor can be provided other offers as well, including, for example, offers to join a travel community, offers for reward points to be redeemed for experiences, travel bookings, travel tickets, etc. Once the experience is complete, the requestor can rate the provider, and the provider can rate the requestor. The rating system advantageously provides a way for requestors and providers to know about each other before booking an experience.

Embodiments described herein can be used in a number of different situations. For example, in the use case of law enforcement, if a particular event is in progress, law enforcement can request a job at the location of the event, and if there are producers present that accept the request, law enforcement can view the event via one or more producers. Another use can include an emergency mode. For instance, in the situation there is a burglary or other event in progress, people can initiate a live view at the location of the theft, and law enforcement can respond to the event using live streams from each of the participants. In another example, a requestor may post a request for a visual and audio experience. For example, a requestor may desire to hear the sounds of a bazaar in Marrakesh, Morocco, and may post a request for such an experience. In yet another example, a school or education system for a geography class may post a request to visit a specific location. For example, a class that is learning something about animals or particular birds that can only be seen in some regions of the forest in Singapore, a request can be posted requesting a producer to live stream such a request.

Figure 7:
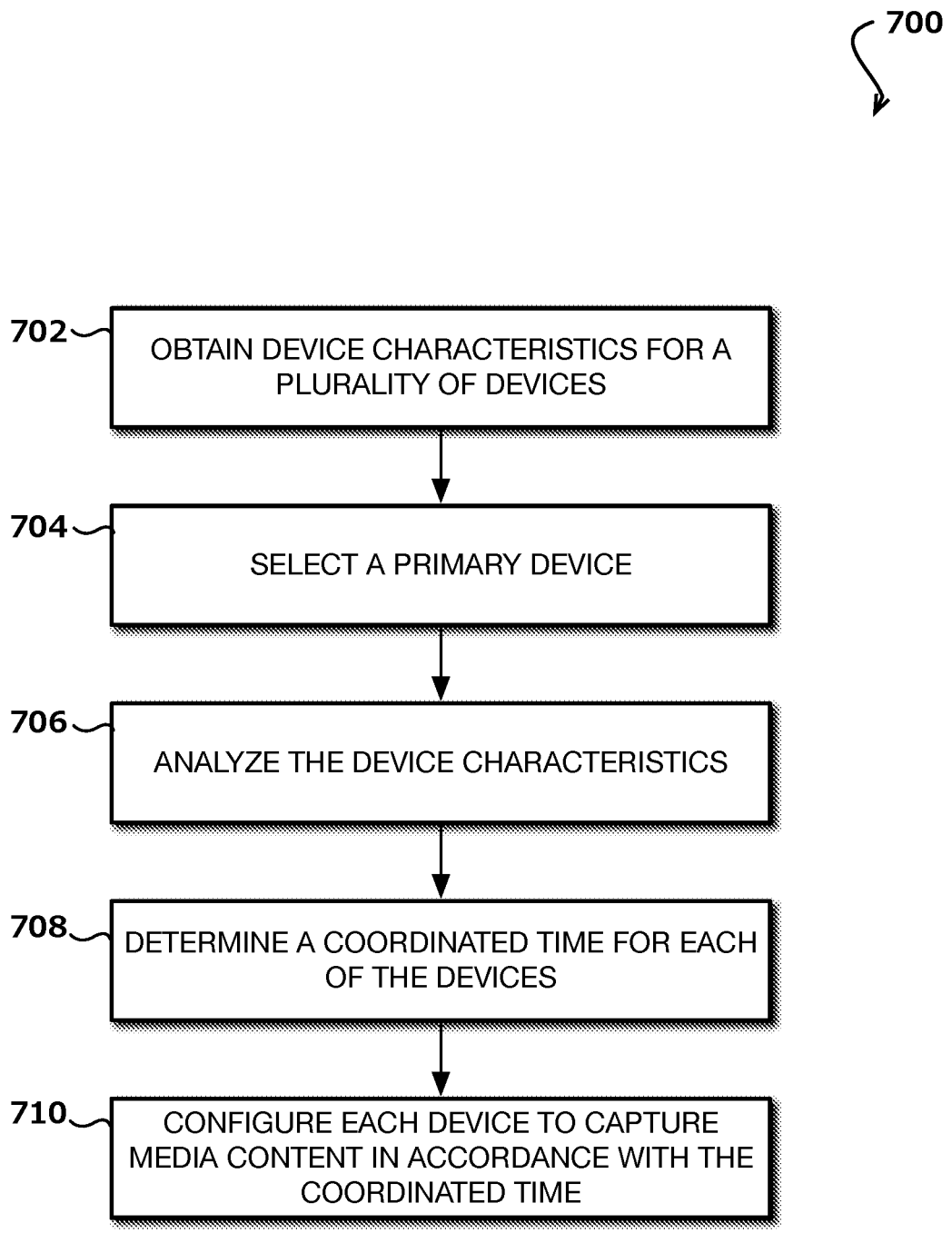
FIG. 7 illustrates an example process for determining a coordinated time in accordance with various embodiments.

FIG. 7 illustrates an example process 700 for determining a coordinated time in accordance with various embodiments. In this example, device characteristics or attributes for a plurality of computing devices is obtained 702. The characteristics can include, for example, for example, orientation and/or position data from motion/orientation determining components of the devices such as gyroscopes, accelerometers, and/or digital compasses, flash brightness, camera resolution, device processing speed, device memory, etc. A primary device is selected 704. The primary device can be predetermined or selected randomly. For example, a device initiating a collaborative data capture session can be the primary device. The primary device can be selected based on characteristics of each of the devices. For example, a device having the fastest processor, most stable internet connection, best view of the point of interest, etc. may be selected. In certain embodiments, a requestor may select the primary device. For example, a requestor can be presented operating characteristics of each of the devices, such as a view of image data captured from each of the devices, battery level of each of the devices, processing speed of each of the devices, memory, etc., and can select which device to have as a primary device. The list of devices can also be ranked, for example, most optimal to the least optimal, and the primary device can be selected based on the list of devices. The device characteristics such as for each of the devices can be analyzed 706 to determine 708 a coordinated time. In certain embodiments, the device characteristics are analyzed with respect to the primary device. For example, based on the orientation and/or position information for each of the devices with respect to the primary device, a coordinated time that allows each device to capture a picture at substantially the time can be determined. In another example, a coordinated time can be determined using the orientation and/or position information for each of the devices that instructs the devices to capture images in a particular order so that particular image data is captured. In yet another example, the coordinated time can be determined using the orientation and/or position information for each of the devices that instructs some devices to capture continuous image data and other devices to capture still images. In still yet another example, the coordinated time can be determined using the orientation and/or position information for each of the devices that instructs the devices to capture image data in response to a trigger event, such the release of a shutter, detection of a flash pattern, or audio signal, environmental event, or other such trigger. Once the coordinated time is determined, for each device independently or the same coordinated time for each device, the coordinate time can be sent 708 to each of the devices, and the devices can be configured 710 to capture data in accordance with their respective coordinate time.

Figures 8A, 8B:
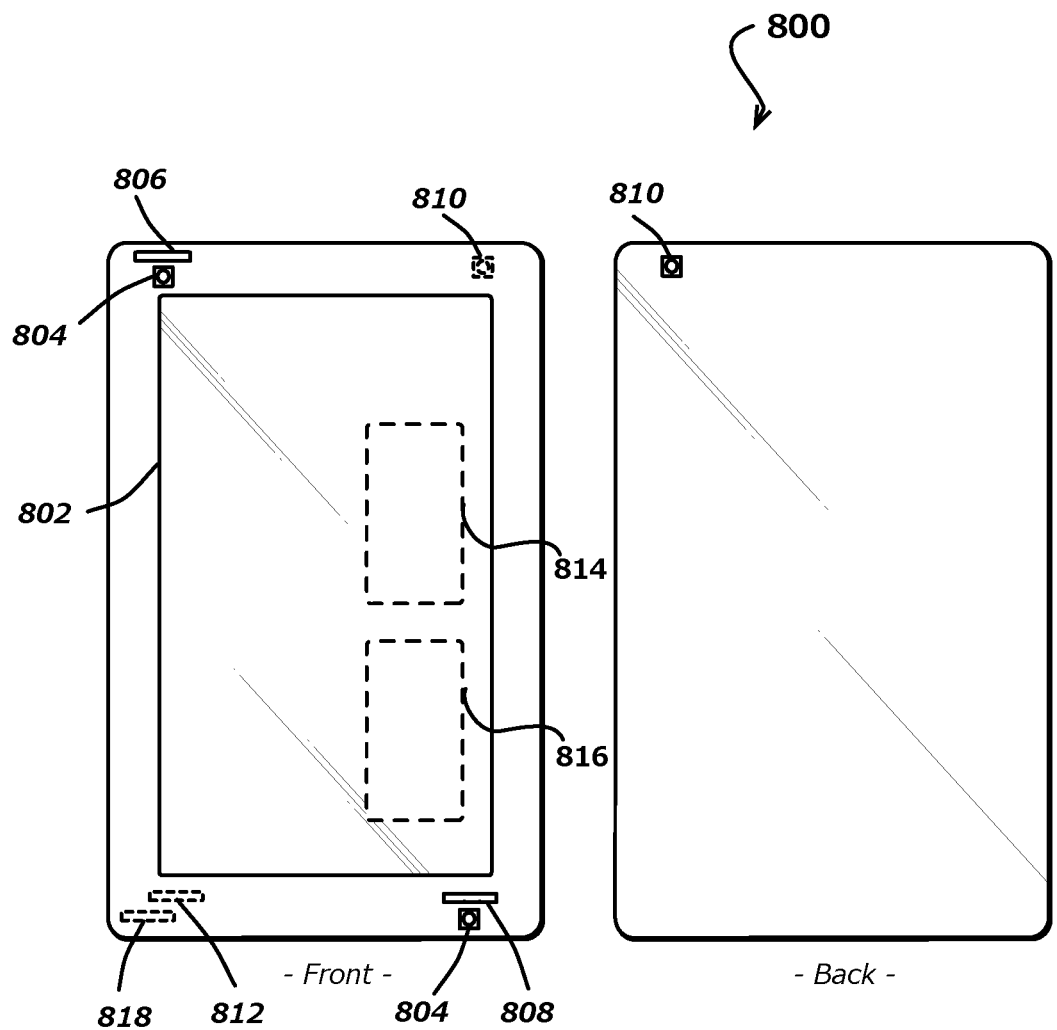
FIGS. 8A and 8B illustrates front and back views of an example device that can be used in accordance with various embodiments.

FIG. 8A illustrates a front view of an electronic device and FIG. 8B illustrates a back view of the example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein, where the devices can include, for example, head-mounted displays, notebook computers, personal data assistants, cellular phones, smart glasses or goggles, smartwatch, unmanned vehicles such as drones or other autonomous vehicles, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

The device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position data, direction data, motion data, or orientation data for the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
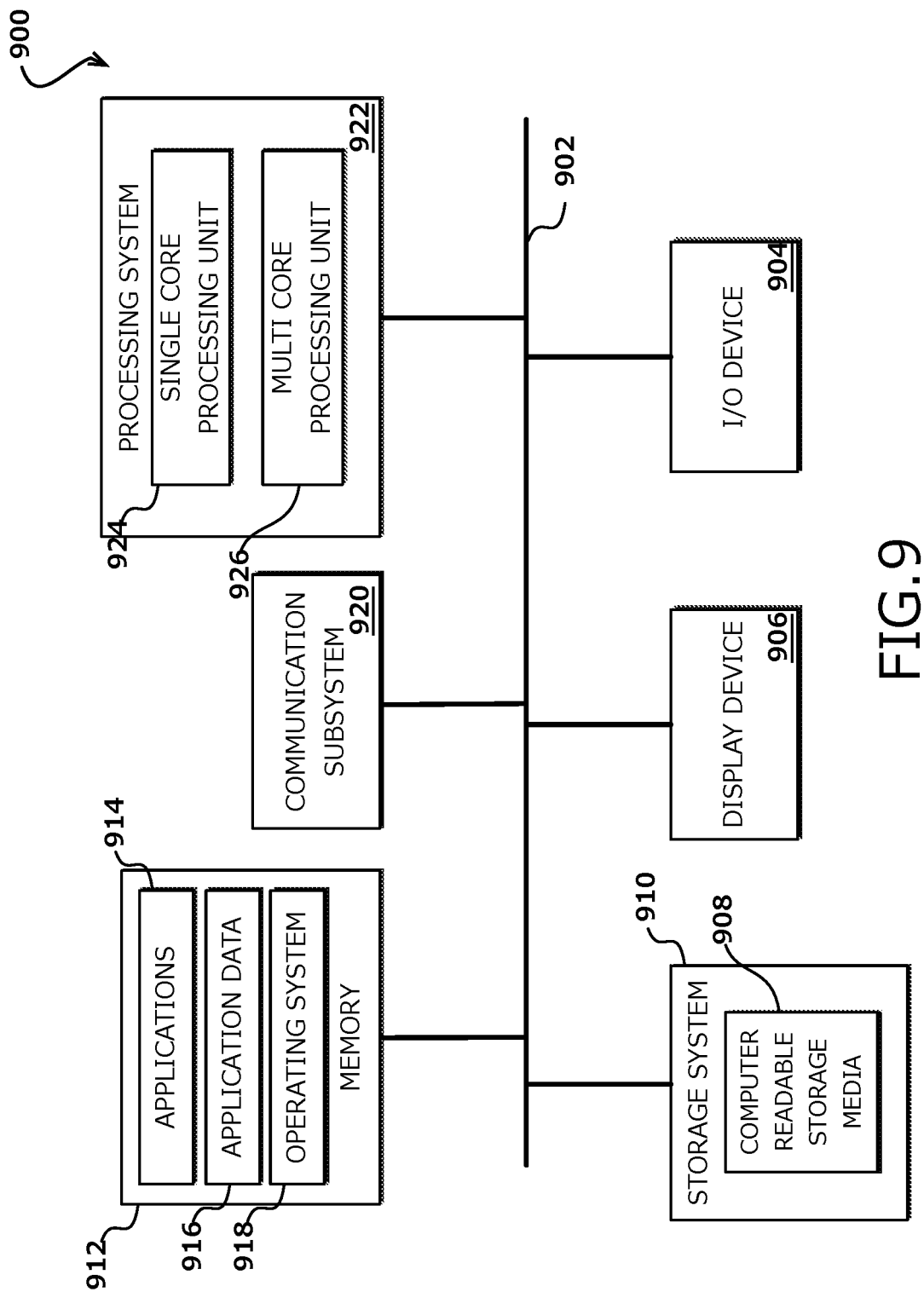
FIG. 9 illustrates an example configuration of components of a device, such as the one illustrated in FIGS. 8A and 8B.

FIG. 9 illustrates a set of basic components of an electronic computing device 900, such as computing device 800 in FIGS. 8A and 8B. In various embodiments, computer device 900 may be used to implement any of the systems, devices, or methods described herein. In some embodiments, computer device 900 may correspond to any of the various devices described herein, including, but not limited to, mobile devices, tablet computing devices, wearable devices, personal or laptop computers, vehicle-based computing devices, or other devices or systems described herein. As shown in FIG. 9, computer device 900 can include various subsystems connected by a bus 902. The subsystems may include an I/O device subsystem 904, a display device subsystem 906, and a storage subsystem 910 including one or more computer-readable storage media 908. The subsystems may also include a memory subsystem 912, a communication subsystem 920, and a processing subsystem 922.

In device 900, bus 902 facilitates communication between the various subsystems. Although a single bus 902 is shown, alternative bus configurations may also be used. Bus 902 may include any bus or other components to facilitate such communication as is known to one of ordinary skill in the art. Examples of such bus systems may include a local bus, parallel bus, serial bus, bus network, and/or multiple bus systems coordinated by a bus controller. Bus 902 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 904 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 904 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer device 900 may include a display device subsystem 906. Display device subsystem may include one or more lights, such as one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 906 may include a controller and/or interface for controlling and/or communicating with an external display, such as any of the above-mentioned display technologies.

As shown in FIG. 9, device 900 may include storage subsystem 910 including various computer-readable storage media 908, such as hard disk drives, solid-state drives (including RAM-based and/or flash-based SSDs), or other storage devices. In various embodiments, computer-readable storage media 908 can be configured to store software, including programs, code, or other instructions, that is executable by a processor to provide the functionality described herein. For example, the instructions, when executed, can enable a computing device to perform automated document negotiation in accordance with the present disclosure may be embodied on a computer-readable medium. This may include automatically obtaining information from parties seeking to negotiate document sections of a document such as a contract; generating a ranking value or other such document selection value for a plurality of candidate contracts possible between the parties based on information from the parties, including their preferences for different sections (e.g., provisions) of the contract; and using the values to optimize an optimization function (e.g., a cost function or other such function) that measures the degree to which candidate contracts satisfy the information provided by the parties to determine a document or document information that satisfies constraints of the parties.

In some embodiments, storage system 910 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 910 can include a media reader, card reader, or other storage interfaces to communicate with one or more external and/or removable storage devices. In various embodiments, computer-readable storage media 908 can include any appropriate storage medium or combination of storage media. For example, computer-readable storage media 908 can include, but is not limited to, any one or more of random access memory (RAM), read-only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer-readable storage media can include data signals or any other medium through which data can be transmitted and/or received.

Memory subsystem 912 can include various types of memory, including RAM, ROM, flash memory, or other memory. Memory 912 can include SRAM (static RAM) or DRAM (dynamic RAM). In some embodiments, memory 912 can include a BIOS (basic input/output system) or other firmware configured to manage initialization of various components during, e.g., startup. As shown in FIG. 9, memory 912 can include applications 914 and application data 916. Applications 914 may include programs, code, or other instructions, that can be executed by a processor. Applications 914 can include various applications such as browser clients, campaign management applications, data management applications, and any other application. Application data 916 can include any data produced and/or consumed by applications 914. Memory 912 can additionally include operating system 918, such as macOS®, Windows®, Linux®, various UNIX® or UNIX- or Linux-based operating systems, or other operating systems.

Device 900 can also include a communication subsystem 920 configured to facilitate communication between device 900 and various external computer systems and/or networks (such as the Internet, a local area network (LAN), a wide area network (WAN), a mobile network, or any other network). Communication subsystem 920 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally, or alternatively, communication subsystem 920 can include hardware and/or software components to communicate with satellite-based or ground-based location services, such as GPS (global positioning system). In some embodiments, communication subsystem 920 may include, or interface with, various hardware or software sensors. The sensors may be configured to provide continuous or and/or periodic data or data streams to a computer system through communication subsystem 920

As shown in FIG. 9, processing system 922 can include one or more processors or other devices operable to control computing device 900. Such processors can include single-core processors 924, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing system 922, such as processors 924 and 926, may be used independently or in combination depending on the application.

Various other configurations are may also be used, with particular elements that are depicted as being implemented in hardware may instead be implemented in software, firmware, or a combination thereof. One of ordinary skill in the art will recognize various alternatives to the specific embodiments described herein.

Figure 10:
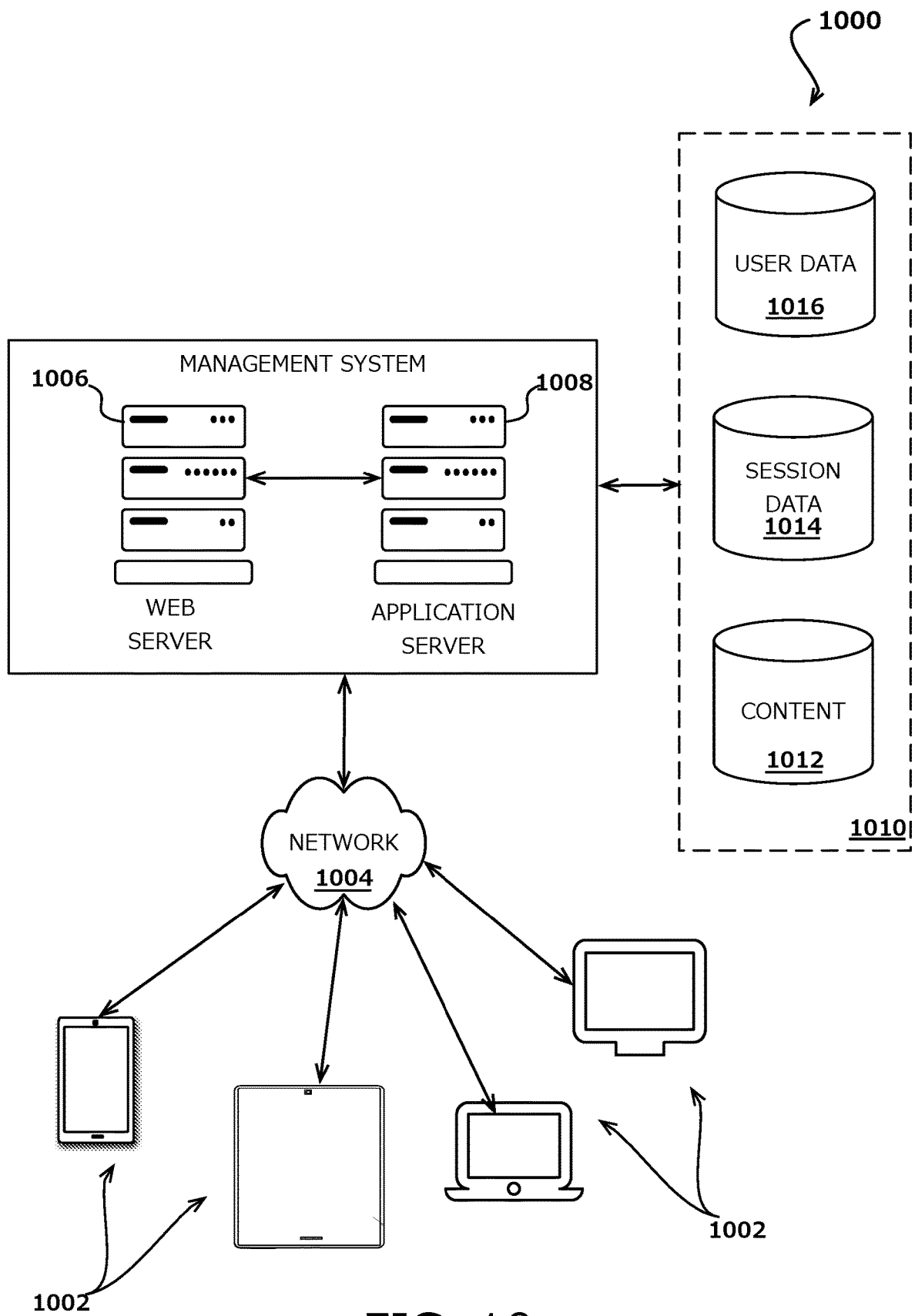
FIG. 10 illustrates an example of an environment for implementing aspects in accordance with various embodiments.

FIG. 10 illustrates an example of an environment 1000 for implementing aspects in accordance with various embodiments. As will be appreciated, although a Web-based environment is used for purposes of explanation, different environments may be used, as appropriate, to implement various embodiments. The environment includes electronic client devices 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and can generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

An environment such as that illustrated in FIG. 10 can be useful for a provider such as an on-demand mixed-reality provider who wishes to enable data capture for use in on-demand mixed-reality experiences (e.g., a live event service, a shopping service, etc.). The provider can utilize a collaborative data capture service which can coordinate the capture of content, generate and present for display mixed-reality experiences from the captured content, connect users (e.g., virtual travelers or virtual participants, or requestors) to providers (e.g., on-demand providers), facilitate payment between requestors and providers, facilitate content licensing between license holders and providers, streamline copyright use, etc.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The methods, systems, and devices discussed above are described with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the above description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Having been provided with the description and illustration of the present application, one skilled in the art may envision variations, modifications, and alternate embodiments falling within the general inventive concept discussed in this application that do not depart from the scope of the following claims.

What is claimed is:

1. A computing system, comprising:
   at least one computing processor; and
   memory including instructions that, when executed by the at least one computing processor, enable the computing system to:
   receive a request to view a live experience associated with a point of interest;
   analyze stored provider information to identify a first provider account to facilitate viewing of the point of interest, the first provider account associated with a first computing device;
   generate first information associated with the first computing device, the first information including a first location identifier representing position coordinates of the first computing device and a timestamp representing a time of generating the first information;
   send a request that includes the first information and an invitation to subscribe to a collaborative data capturing session for the live experience;
   receive an acceptance to the request, the acceptance associated with second information, the second information including a second location identifier representing position coordinates of a second computing device, a timestamp representing a time of generating the second information, or orientation information representing an orientation of the second computing device at the time of generating the second information;
   determine a time period for the first computing device to capture first data of the point of interest and the second computing device to capture second data of the point of interest based on the first information and the second information;
send first computer-readable instructions to cause the first computing device to capture the first data within the time period;
send second computer-readable instructions to cause the second computing device to capture the second data within the time period;
receive the first data and the second data; and
generate composited data using the first data and the second data, the composited data operable to provide a view of the point of interest, wherein the composited data is generated by:
analyzing the first data and the second data in real time to determine feature points of the point of interest;
defining feature descriptors from the feature points, wherein each feature descriptor of the feature descriptors comprises a color, a texture, a shape, or some combination thereof;
filtering stored images based on the first information and the second information; and
correlating the feature descriptors with the filtered stored images.

2. The computing system of claim 1, wherein the first computing device includes a first data capturing component and the second computing device includes a second data capturing component, the first data capturing component and the second data capturing component configured to capture one of image data, audio data, motion data, or scent data.

3. The computing system of claim 2, wherein the instructions when executed by the at least one computing processor further enable the computing system to:
determine a coordinated time at which the first data capturing component releases a first shutter to capture the first data and the second data capturing component releases a second shutter to capture the second data.

4. The computing system of claim 2, wherein the instructions when executed by the at least one computing processor further enable the computing system to:
detect a release of a first shutter of the first data capturing component; and
send the second computer-readable instructions to cause the second data capturing component to release a second shutter to capture the second data.

5. The computing system of claim 1, wherein the composited data represents at least one of a three-dimensional representation of the point of interest, a panorama of the point of interest, or a live video feed of the point of interest.

6. The computing system of claim 1, wherein the instructions when executed by the at least one computing processor further enable the computing system to:
receive data corresponding to input to a shutter button of the first computing device; and
cause a shutter release of the first computing device to be delayed until at least the time period.

7. The computing system of claim 1, wherein the instructions when executed by the at least one computing processor further enable the computing system to:
provide for display the composited data to at least one requestor.

8. The computing system of claim 1, wherein the instructions when executed by the at least one computing processor further enable the computing system to:
receive a request to schedule a collaborative data capturing session;
send a plurality of invitations to provider accounts to subscribe to the collaborative data capturing session; and
connect at least a portion of the provider accounts to the collaborative data capturing session.

9. The computing system of claim 1, wherein the instructions when executed by the at least one computing processor further enable the computing system to:
obtain user data;
analyze the user data to recommend a collaborative data capturing session;
send a plurality of invitations to provider accounts to subscribe to the collaborative data capturing session; and
connect at least a portion of the provider accounts to the collaborative data capturing session.

10. A computer-implemented method, comprising:
receiving a request to view a live experience associated with a point of interest;
analyzing stored provider information to identify a first provider account to facilitate viewing of the point of interest, the first provider account associated with a first computing device;
generating first information associated with the first computing device, the first information including a first location identifier representing position coordinates of the first computing device and a timestamp representing a time of generating the first information;
sending a request that includes the first information and an invitation to subscribe to a collaborative data capturing session for the live experience;
receiving an acceptance to the request, the acceptance associated with second information, the second information including a second location identifier representing position coordinates of a second computing device, a timestamp representing a time of generating the second information, or orientation information representing an orientation of the second computing device at the time of generating the second information;
determining a time period for the first computing device to capture first data of the point of interest and the second computing device to capture second data of the point of interest based on the first information and the second information;
sending first computer-readable instructions to cause the first computing device to capture the first data within the time period;
sending second computer-readable instructions to cause the second computing device to capture the second data within the time period;
receiving the first data and the second data; and
generating composited data using the first data and the second data, the composited data operable to provide a view of the point of interest, wherein the composited data is generated by:
analyzing the first data and the second data in real time to determine feature points of the point of interest;
defining feature descriptors from the feature points, wherein each feature descriptor of the feature descriptors comprises a color, a texture, a shape, or some combination thereof;
filtering stored images based on the first information and the second information; and
correlating the feature descriptors with the filtered stored images.

11. The computer-implemented method of claim 10, wherein the first data and the second data include at least one of real-time video feed of the point of interest, audio data, motion data, scent, or image data.

12. The computer-implemented method of claim 10, wherein the first computing device includes a first data capturing component and the second computing device includes a second data capturing component, the computer-implemented method further comprising:
determining a coordinated time at which the first data capturing component releases a first shutter to capture the first data and the second data capturing component releases a second shutter to capture the second data.

13. The computer-implemented method of claim 12, further comprising:
detecting a release of a first shutter of the first data capturing component; and
sending the second computer-readable instructions to cause the second data capturing component to release a second shutter to capture the second data.

14. The computer-implemented method of claim 10, further comprising:
receiving data corresponding to input to a shutter button of the first computing device; and
causing a shutter release of the first computing device to be delayed until at least the time period.

15. The computer-implemented method of claim 10, further comprising:
receiving a request to schedule a collaborative data capturing session;
sending a plurality of invitations to provider accounts to subscribe to the collaborative data capturing session; and
connecting at least a portion of the provider accounts to the collaborative data capturing session.

16. The computer-implemented method of claim 10, further comprising:
obtaining user data;
analyzing the user data to recommend a collaborative data capturing session;
sending a plurality of invitations to provider accounts to subscribe to the collaborative data capturing session; and
connecting at least a portion of the provider accounts to the collaborative data capturing session.

17. A non-transitory computer readable storage medium storing one or more sequences of instructions executable by one or more processors to perform a set of operations comprising:
receiving a request to view a live experience associated with a point of interest;
analyzing stored provider information to identify a first provider account to facilitate viewing of the point of interest, the first provider account associated with a first computing device;
generating first information associated with the first computing device, the first information including a first location identifier representing position coordinates of the first computing device and a timestamp representing a time of generating the first information;
sending a request that includes the first information and an invitation to subscribe to a collaborative data capturing session for the live experience;
receiving an acceptance to the request, the acceptance associated with second information, the second information including a second location identifier representing position coordinates of a second computing device, a timestamp representing a time of generating the second information, or orientation information representing an orientation of the second computing device at the time of generating the second information;
determining a time period for the first computing device to capture first data of the point of interest and the second computing device to capture second data of the point of interest based on the first information and the second information;
sending first computer-readable instructions to cause the first computing device to capture the first data within the time period;
sending second computer-readable instructions to cause the second computing device to capture the second data within the time period;
receiving the first data and the second data; and
generating composited data using the first data and the second data, the composited data operable to provide a view of the point of interest, wherein the composited data is generated by:
analyzing the first data and the second data in real time to determine feature points of the point of interest;
defining feature descriptors from the feature points, wherein each feature descriptor of the feature descriptors comprises a color, a texture, a shape, or some combination thereof;
filtering stored images based on the first information and the second information; and
correlating the feature descriptors with the filtered stored images.

18. The non-transitory computer readable storage medium of claim 17, wherein the first computing device includes a first data capturing component and the second computing device includes a second data capturing component, further comprising instructions executed by the one or more processors to perform the operations of:
determining a coordinated time at which the first data capturing component releases a first shutter to capture the first data and the second data capturing component releases a second shutter to capture the second data.

19. The non-transitory computer readable storage medium of claim 18, further comprising instructions executed by the one or more processors to perform the operations of:
detecting a release of a first shutter of the first data capturing component; and
sending the second computer-readable instructions to cause the second data capturing component to release a second shutter to capture the second data.

20. The non-transitory computer readable storage medium of claim 17, further comprising instructions executed by the one or more processors to perform the operations of:
providing for display the composited data to at least one requestor.

* * * * *